(12) United States Patent
Malloy et al.

(10) Patent No.: US 9,009,304 B2
(45) Date of Patent: *Apr. 14, 2015

(54) MAPPING VIRTUAL INTERNET PROTOCOL ADDRESSES

(75) Inventors: Patrick J. Malloy, Washington, DC (US); John Wilson Strohm, Rockville, MD (US); Gehl Ryan, Silver Spring, MD (US); Antoine Dunn, Silver Spring, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/487,863

(22) Filed: Jun. 4, 2012

(65) Prior Publication Data

US 2012/0246307 A1 Sep. 27, 2012

Related U.S. Application Data

(63) Continuation of application No. 11/832,923, filed on Aug. 2, 2007, now Pat. No. 8,195,736.

(60) Provisional application No. 60/821,822, filed on Aug. 8, 2006.

(51) Int. Cl.
*G06F 15/173* (2006.01)
*H04L 29/12* (2006.01)
*H04L 12/24* (2006.01)
*H04L 29/08* (2006.01)

(52) U.S. Cl.
CPC ........... *H04L 29/12028* (2013.01); *H04L 41/22* (2013.01); *H04L 61/103* (2013.01); *H04L 67/02* (2013.01)

(58) Field of Classification Search
USPC .......................... 709/200, 220, 221, 223–225
See application file for complete search history.

(56) References Cited

U.S. PATENT DOCUMENTS

| | | | |
|---|---|---|---|
| 5,821,937 | A | 10/1998 | Tonelli et al. |
| 6,229,540 | B1 | 5/2001 | Tonelli et al. |
| 6,691,165 | B1 | 2/2004 | Bruck et al. |
| 6,775,278 | B1 | 8/2004 | Britton et al. |
| 6,801,949 | B1 | 10/2004 | Bruck et al. |
| 6,856,591 | B1 | 2/2005 | Ma et al. |
| 7,020,796 | B1 | 3/2006 | Ennis et al. |
| 7,134,012 | B2 | 11/2006 | Doyle et al. |
| 7,152,119 | B2 | 12/2006 | Na et al. |
| 7,260,648 | B2 | 8/2007 | Tingley et al. |
| 7,290,048 | B1 | 10/2007 | Barnett et al. |
| 7,299,294 | B1 | 11/2007 | Bruck et al. |

(Continued)

*Primary Examiner* — Linglan Edwards
(74) *Attorney, Agent, or Firm* — Park, Vaughan, Fleming & Dowler LLP

(57) ABSTRACT

The embodiments provide for analyzing activity of devices in a network. Activity from a device may result from multiple devices translated to a common address, such as a public internet protocol (IP) address. In some embodiments, the activity from a network or device is analyzed to identify if multiple devices communicate via translated addresses from the common address. The devices may be identified based on various criteria, such as a unique identifier, protocol header information, or a media access control (or "MAC") address. Other criteria may also be employed. Each device that is mapped to common address is then remapped so that each device has its own address. The activity data is then modified so that each device is correlated with its unique address. Alternatively, a new activity data file may be generated so that the activity of each device is indicated.

21 Claims, 3 Drawing Sheets

(56) References Cited

U.S. PATENT DOCUMENTS

| | | | |
|---|---|---|---|
| 7,343,397 B2 * | 3/2008 | Kochanski | 709/218 |
| 7,480,710 B1 | 1/2009 | Olson et al. | |
| 7,505,399 B2 | 3/2009 | McGee et al. | |
| 7,506,360 B1 | 3/2009 | Wilkinson et al. | |
| 7,561,587 B2 | 7/2009 | Douglass et al. | |
| 8,135,815 B2 * | 3/2012 | Mayer | 709/223 |
| 2002/0099937 A1 | 7/2002 | Tuomenoksa | |
| 2002/0138628 A1 | 9/2002 | Tingley et al. | |
| 2003/0043853 A1 | 3/2003 | Doyle et al. | |
| 2003/0069993 A1 | 4/2003 | Na et al. | |
| 2003/0145075 A1 | 7/2003 | Weaver et al. | |
| 2003/0153328 A1 * | 8/2003 | Booth et al. | 455/456 |
| 2003/0159071 A1 | 8/2003 | Martinez et al. | |
| 2003/0179761 A1 | 9/2003 | Dobbins et al. | |
| 2003/0191590 A1 | 10/2003 | Narayan et al. | |
| 2004/0093419 A1 * | 5/2004 | Weihl et al. | 709/229 |
| 2004/0095932 A1 | 5/2004 | Astarabadi et al. | |
| 2004/0109447 A1 | 6/2004 | Douglass et al. | |
| 2004/0162914 A1 | 8/2004 | St. Pierre et al. | |
| 2004/0162915 A1 | 8/2004 | Caronni et al. | |
| 2004/0249906 A1 * | 12/2004 | Olbricht et al. | 709/220 |
| 2004/0249975 A1 | 12/2004 | Tuck et al. | |
| 2005/0005006 A1 | 1/2005 | Chauffour et al. | |
| 2005/0010819 A1 | 1/2005 | Williams et al. | |
| 2005/0044199 A1 | 2/2005 | Shiga et al. | |
| 2005/0111352 A1 | 5/2005 | Ho et al. | |
| 2005/0111455 A1 | 5/2005 | Nozue et al. | |
| 2005/0165961 A1 | 7/2005 | Unbehagen et al. | |
| 2005/0198295 A1 | 9/2005 | Turkoglu | |
| 2005/0198401 A1 | 9/2005 | Chron et al. | |
| 2006/0015607 A1 * | 1/2006 | Fava et al. | 709/224 |
| 2006/0031488 A1 | 2/2006 | Swales | |
| 2006/0034190 A1 | 2/2006 | McGee et al. | |
| 2006/0039386 A1 | 2/2006 | Park | |
| 2006/0062141 A1 | 3/2006 | Oran | |
| 2006/0088037 A1 | 4/2006 | Finley et al. | |
| 2006/0129669 A1 | 6/2006 | Kojima | |
| 2006/0161770 A1 | 7/2006 | Goto et al. | |
| 2006/0253564 A1 | 11/2006 | Shiga et al. | |
| 2006/0265515 A1 | 11/2006 | Shiga et al. | |
| 2006/0274745 A1 | 12/2006 | Wang et al. | |
| 2006/0279775 A1 | 12/2006 | Matsumoto et al. | |
| 2006/0282527 A1 | 12/2006 | Chiou et al. | |
| 2007/0011450 A1 | 1/2007 | McCreight et al. | |
| 2007/0025253 A1 | 2/2007 | Enstone et al. | |
| 2007/0124468 A1 | 5/2007 | Kovacsiss, III | |
| 2007/0214282 A1 | 9/2007 | Sen | |
| 2007/0237141 A1 | 10/2007 | Marchese | |
| 2007/0239854 A1 | 10/2007 | Janakiraman et al. | |
| 2007/0250845 A1 | 10/2007 | Walter et al. | |
| 2007/0291654 A1 * | 12/2007 | Pepper | 370/252 |

* cited by examiner

MAPPING VIRTUAL INTERNET PROTOCOL ADDRESSES

CROSS-REFERENCE TO RELATED APPLICATIONS

This application is a continuation of U.S. patent application Ser. No. 11/832,923, filed Aug. 2, 2007, entitled "Mapping Virtual Internet Protocol Addresses," which claims the benefit of U.S. Provisional Patent Application No. 60/821,822, filed Aug. 8, 2006, both of which are incorporated by reference in their entirety

BACKGROUND

The present system relates to the field of network troubleshooting and analysis and particularly to a system and method of identifying tiers present in an activity data file.

In the field of network application performance prediction and analysis, it is not uncommon to capture network activity, such as packets transferring between points in a network, using packet sniffers, protocol analyzers, etc. In operation, data related to network activity, such as packet transfers, may be recorded to one or more activity data files, such as trace files. The activity data files may be later analyzed using one or more analysis tools.

Typically, one part of the analysis process is to determine the network devices, termed tiers or nodes, which are responsible for activity that is recorded in the activity data file. It is also desirable to determine the number of network devices responsible for activity. This is typically accomplished by assigning one tier to each unique IP address. However, in many cases this approach is insufficient. For example, in a case wherein some of the network activity is attributed to a router (tier) that utilizes network address translation (NAT) to route data from an internal network to an external network, such as the Internet, activity that actually is attributed to multiple objects (e.g., devices or portions thereof, such as a network interface card (NIC)) within the private network may all appear within the activity data file as attributed to the router. This problem occurs because in the use of NAT, separate (private) addresses of the multiple network objects may be mapped to a single public Internet Protocol (IP) address. Due to the NAT, the public IP address is actually a virtual IP address that is resolved to the private IP address of a given object by the router when data is received from the public network. Similarly, when data is received by the router from a device within the internal network (e.g., private network), the source of the data is altered by the router to reflect the virtual IP address of the router before being sent to a destination device accessible on the public network. It is desirable to be able to separate out the network activity (e.g., traffic) sent from/to a given host to/from the virtual address.

This problem may be ameliorated by locating a packet sniffer within the private network so that the tiers responsible for activity may be captured by the sniffer, however, this approach is not practical for many applications. For example, it may not be practical to position a sniffer within each of potentially numerous private networks that may exist in a network configuration and/or one or more of the private networks may not be under the direct control of the party operating the activity capture. In addition, different private networks may internally utilize a same addressing scheme (e.g., 192.168.0.1's). So even in a case wherein a sniffer is placed within the private network, if you simply combine the trace files, you might end up seeing several (different) tiers having a same address. Further, it is oftentimes more convenient to capture network activity from some point outside of the network portion wherein NAT occurs. In these and other instances where more than one machine appears to have the same IP address (e.g., load balancing, failover, transparent proxying, overlapping networks, etc.), the analysis tools may determine that there are fewer tiers than there really are, and thereby, present the user with inaccurate or incomplete data.

It is an object of the present system to overcome disadvantages and/or make improvements in the prior art.

The present system includes a system, method and device for remapping a Media Access Control (MAC) address mapped to a virtual IP addresses. The method includes examining an activity data file to identify the virtual IP address mapped to the MAC address and remapping the identified MAC address to an IP address. The MAC address may be one of two or more MAC addresses mapped to the virtual IP address. The virtual IP address may be identified by determining that the virtual IP address has at least two mapped MAC addresses. Other criteria may also (or in place of) be utilized for identifying virtual IP addresses. A portion of the IP address may be automatically generated. A user may be queried to confirm the generated portion of the IP address. The portion of the IP address may be determined based on prior user entrance of an IP address that includes the portion of the IP address. The portion of the IP address may be predetermined by a user assigning a naming convention.

The remapping may include querying a user to enter a portion of the IP address. Tiers may be assigned to each MAC address recorded in the activity data file. A user may be provided with a interface (UI) depicting the virtual IP address and the MAC address(es) including an identification whether the virtual IP address and the corresponding MAC address(es) are sources or destinations for given activity. The UI may include a tree-view depicting the virtual IP address and the MAC address(es). The UI may include a table view depicting the MAC address(es). The table view may include an indication of the virtual IP address and a field for the IP address. The table view may list a remapped MAC address. The remapping may be saved in the activity data file or in another activity data file. A number of tiers corresponding to activity recorded in the activity data file may be determined after the MAC address is remapped. Through operation of the present system, a source and destination endpoint (e.g., true endpoints) may be readily determined.

BRIEF DESCRIPTION OF THE DRAWINGS

The invention is explained in further detail, and by way of example, with reference to the accompanying drawings wherein.

DETAILED DESCRIPTION

Figure 1:
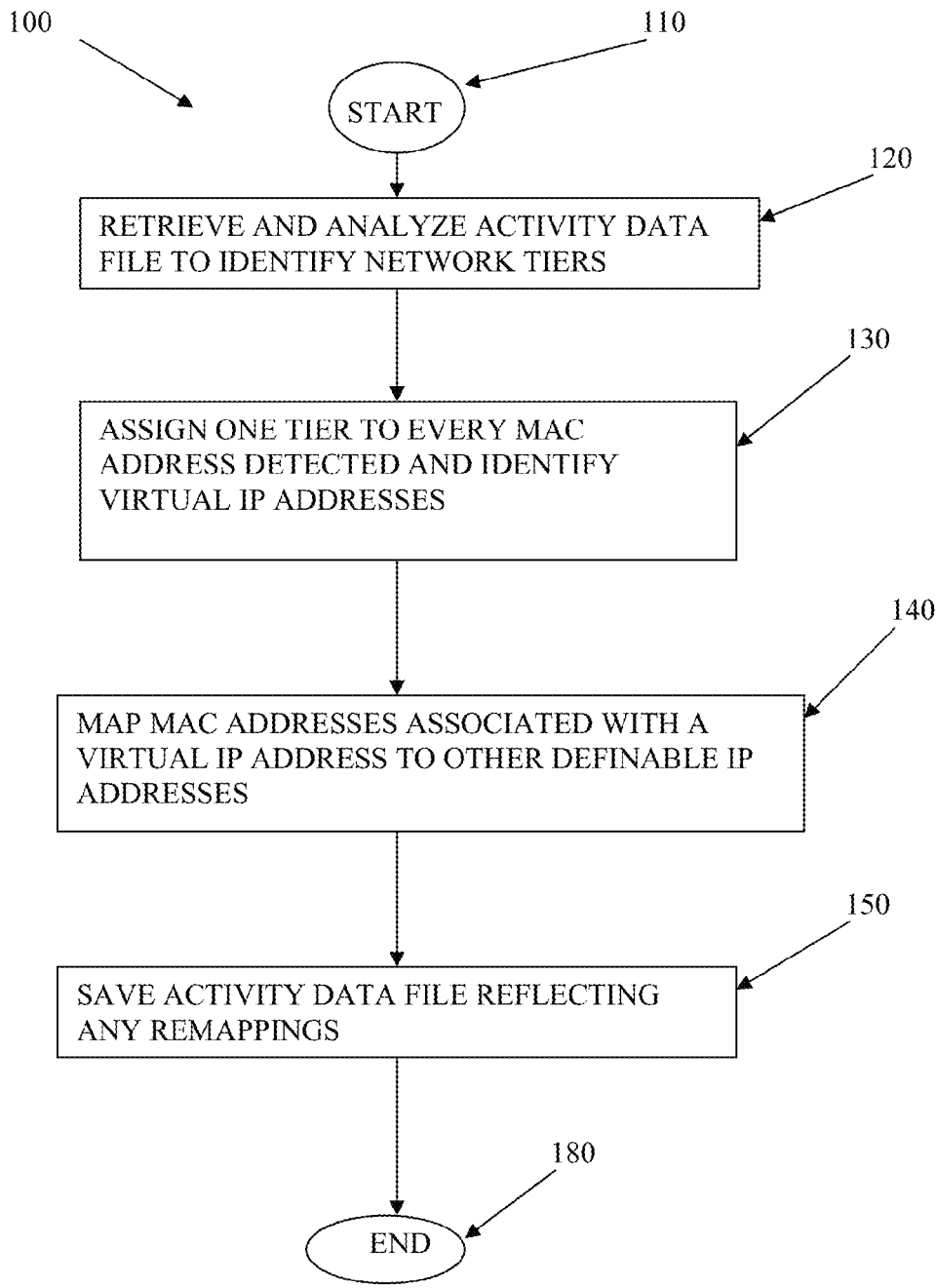
FIG. 1 shows an illustrative flow diagram of a process in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system. In the drawings, a first part of an element's reference number typically corresponds to the drawing number in which the element appears.

The system and method described herein address problems in prior art systems. The present system is directed towards providing a new and intuitive system for determining a proper number of tiers responsible for activity within an activity data file. To facilitate the following discussion, for purposes of simplifying a description, the term "activity" as utilized herein is intended to include any activity related to a network object, including traffic, delays, collisions, housekeeping processes, and any other operations of a network object. The term "activity data file" is utilized herein to refer to a record of network activity, such as a trace file, although is intended to include any one or more files utilized to record network activity. Through use of the present system, an activity data file may be corrected to properly reflect a number of tiers responsible for network activity. The present system, including a graphical user interface for facilitating user interaction, offers a range of features and provides functionality for the user that is unavailable in prior systems. In accordance with the present system, an activity data file may be altered to reflect a proper number of tiers. The altered activity data file may then be saved as a separate file or in place of the original activity data file for use by an analysis tool. Further, a naming convention for added tiers may be selected by the user to facilitate an identification of the added tiers in subsequent analysis.

The present system will be further described referring to FIG. 1 and following figures. FIG. 1 shows an illustrative flow diagram 100 of a process in accordance with an embodiment of the present system. The process starts during act 110, for example, in response to a user request. In a further embodiment, the process may start in response to a request from another program or program portion. For example, the present system may be initiated by an activity data file analysis tool to correct the activity data file prior to analysis. During act 120, the activity data file is retrieved and analyzed to identify tiers that correspond to network activity. One tier is assigned to each Media Access Control (MAC) address recorded in the activity data file during act 130 and MAC addresses associated with virtual Internet Protocol (IP) addresses are identified. In one embodiment in accordance with the present system, virtual IP addresses may be identified by referring to a file of virtual IP addresses and corresponding MAC addresses. During act 140, one or more MAC addresses associated with one or more virtual addresses are mapped to definable IP addresses. In accordance with an embodiment of the present system, the definable IP addresses may be defined by the user.

Figure 2:
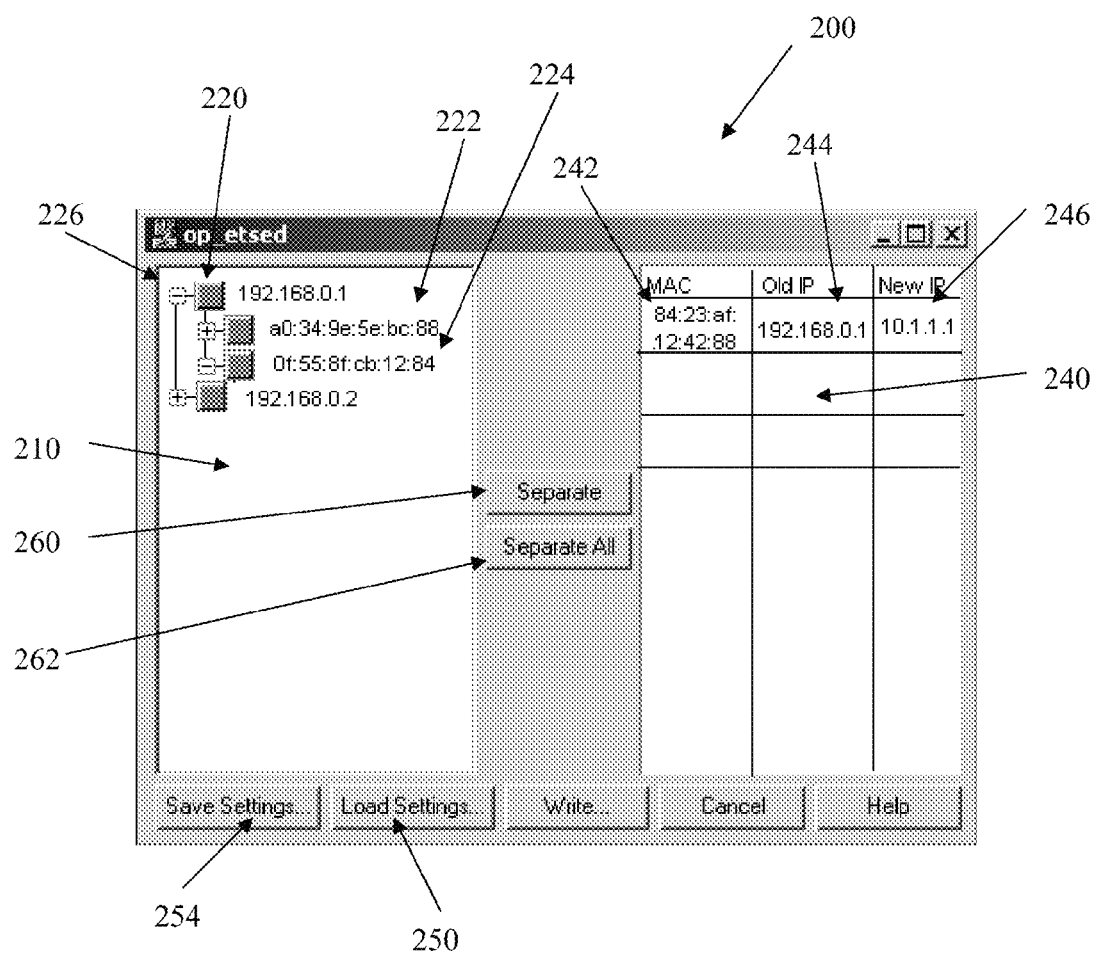
FIG. 2 shows an illustrative user interface (UI) as a graphical user interface (GUI) that may be utilized in accordance with the present system.

FIG. 2 shows an illustrative user interface (UI) 200 as a graphical user interface (GUI) that may be utilized in accordance with the present system for remapping MAC addresses associated with a virtual IP address. The UI 200 is illustratively shown depicted including a typical windowing environment. Menu items provided may be typical of those in a windowing environment, such as may be represented within a Windows™ Operating System GUI as provided by Microsoft Corporation or any other windowing environment. The objects and sections of the visualization may be navigated utilizing a user input device, such as a mouse, trackball and/or other suitable user input. The user input device may be utilized for selecting MAC addresses for remapping and other depicted objects within the GUI as discussed further herein. Further, the user input may be utilized for selection of menu items, radio buttons and other common interaction paradigms as understood by a person of ordinary skill in the art.

In accordance with an embodiment, the GUI 200 includes a tree-view portion 210, such as a window pane, that lists virtual IP addresses that are associated with more than one MAC address. The tree-view 210 may be provided as a hierarchical view wherein objects, such as multiple MAC addresses associated with a virtual IP address are depicted as sub-objects of an object representing the virtual IP address. Further sub-objects of sub-objects, when present in the network, may be similarly represented. In accordance with an embodiment and to facilitate a review of virtual IP addresses, virtual IP addresses associated with (e.g., mapped to) only one (1) MAC address may not appear in the tree-view. For example, in one embodiment, if a single MAC address is associated with a virtual IP address, the present system may automatically remap the MAC address to a private network address, such as a one of designated private IP address subnets suggested as Best Current Practice in response to a Request for Comments (RFC) 1918 from the Network Working Group. RFC 1918 suggests Private Network Addresses may be designated as 192.168.x.x, 172.16.x.x through 172.31.x.x or 10.x.x.x, wherein the "x's" designate sub-addresses that may be automatically allocated by the present system. For example, the present system may allocate private network addresses in the 10.100.x.x range to facilitate an identification of automatically mapped MAC addresses by a user. As may be readily appreciated, other addresses and addressing schemes may be readily applied in accordance with the present system, such as sequential address allocation, allocation to represent network structure, network hierarchy, etc. In this way, a virtual IP address that only has one associated MAC address may be remapped to an IP address without requiring user intervention. In another embodiment of the present system, remapped IP addresses may be suggested to the user in accordance with a scheme as suggested above, so that the user may approve a suggested remapping. Naturally in another embodiment, a virtual IP address associated with a single MAC address may be depicted within the GUI 200 for remapping as described further herein.

The virtual IP address and underlying MAC address(es) may be provided in a hierarchical view wherein the virtual IP address is depicted as a root object with the underlying MAC address(es) provided as sub-objects. For example, in FIG. 2, the virtual IP address 192.168.0.1 is provided as a root object 220, having sub-objects 222 (MAC address a0:34:9e:5e:bc:88), 224 (MAC address 0f:55:8f:cb:12:84). A selection box 226, depicted within the tree-view 210 before one or more of the objects 220, 222, 224, may be utilized to expand (e.g., plus-box) the objects to display sub-objects or to contract sub-objects (e.g., minus-box) as may be readily appreciated.

Through operation of a user selection device, such as a computer mouse, a user may select a MAC address depicted in the tree-view 210 by manipulation of a mouse-cursor as may be readily appreciated. In accordance with an embodiment of the present system, the selected MAC address may be mapped to a new IP address. In accordance with one embodiment of the present system, when a MAC address is selected in the tree-view 210, the MAC address may also appear in a table-view 240 as described further herein to facilitate review and/or remapping. After the MAC address is assigned (remapped) to a new IP address, the MAC address may disappear from the tree-view 210. In a further embodiment, when all MAC addresses assigned to a virtual IP address have been remapped, the virtual IP address may disappear from the tree-view 210. In this way, only virtual IP addresses that have MAC addresses that have not been remapped will appear/remain in the tree-view 210. As may be readily appreciated, the present system facilitates review and/or remapping of virtual IP addresses that have two or more (underlying) associated MAC addresses and one associated MAC address (as described above).

The table-view 240 may list one or more selected MAC addresses in a MAC address field 242 and corresponding Old IP addresses in an Old IP address field 244. A New IP address field 246 may also be provided associated with the one or more selected MAC addresses to facilitate reassignment of a MAC address (assigned to a virtual IP address) to a new IP address. The table view 240 may also or in place of depict a virtual IP address that only has one associated MAC address. As may be readily appreciated, the following discussion regarding two or more selected MAC address applies equally wherein only one MAC address is associated with a virtual IP address. As such, the new IP address field 246 may be modifiable to enable a user to enter the new IP address.

In accordance with the present system, the New IP address field 246 may be partially filled in utilizing a predetermined or determinable system for selecting a portion of the New IP address. For example, in one embodiment, the portion of the New IP address may be filled in by the present system based on an identifier utilized to designate a sub-portion of a network from which the virtual IP address is physically and/or hierarchically (e.g., structurally) located. In one embodiment, the portion of the New IP address may be filled in with a designation of a network node for which the virtual IP address is structurally located as a sub-node. In another embodiment, the portion of the New IP address may be filled in based on past behavior by the user. For example, in one embodiment wherein a user repeated one or more particular portions of the New IP address two or more times, the present system may fill in the portion(s) of the New IP address that were previously repeated. In an alternate embodiment, the New IP address may start off blank enabling ready reassignment. The fields 242, 244, 246 may be visually organized to facilitate association between the MAC address, the Old IP address and the New IP address. For example, the fields may be organized in rows and columns to facilitate the association. In another embodiment, a further visual metaphor may be employed to facilitate the association.

The table-view 240 may list newly mapped (remapped) MAC addresses as well as, or in place of, the above described MAC address that has not been remapped. The newly mapped MAC addresses may include the old IP address (e.g., field 244) and the new IP address (e.g., field 246). In one embodiment, users may edit elements depicted in the new IP address column (e.g., New IP addresses), as well as "un-map" (e.g., de-assign) a MAC address. For example, a New IP address may be cleared in the field 246 by the user to un-map a virtual IP address. In accordance with an embodiment, a de-assigned MAC address may re-appear in the tree-view 210.

Load and/or Save Settings buttons 250, 254 may enable the user to load or save the current mappings. In one embodiment, the mappings may be saved to a text file. In a further embodiment, the text file may be manually edited by the user if desired to facilitate mapping/remapping/de-mapping without use of the GUI 200, prior to use of the GUI, and/or subsequent to use of the GUI 200. In response to actuation of the Load Settings button 250, an embodiment of the present system will load a file that includes a remapping of a MAC address. The remapping present in the loaded file will have an effect of remapping the MAC address for the activity data file currently being analyzed (e.g., see, FIG. 1, acts 120, 130).

A Separate button 260 and/or a Separate All button 262 may be provided to automatically reassign one or more MAC addresses associated with a virtual address. For example, in one embodiment, an auto-split feature may be performed through selection of the Separate All button 262. The auto-split feature in operation may remap all MAC addresses into new IP addresses without a need to perform the remapping process manually. The separate button 260 may operate to remap a selected MAC address to a New IP address without requiring user selection of the New IP address.

In an alternate embodiment of the present system, MAC addresses may be automatically assigned New IP addresses without any user intervention or operation. In this embodiment, the GUI 200 may be utilized to confirm/edit automatically assigned IP addresses. The automatically assigned IP addresses may be assigned according to a predetermined convention such that the user may easily identify the affected tiers. In one embodiment, the predetermined convention may facilitate a ready identification of the mapping as being automatically generated. For example a given IP address or address portion may be utilized for all automatically remapped addresses. A template may be utilized to configure automatic mappings.

Returning to FIG. 1, during act 150, the activity data file may be modified replacing the virtual IP addresses with the New IP addresses, such as the user and/or system defined/edited IP addresses. In an alternate embodiment or at the option of the user, a new activity data file may be created reflecting the remapped addresses and tier count while leaving the original activity data file the in the same state as prior to act 110. The process may end with act 180. The modified activity data file or new activity data file may be utilized thereafter by a network analysis tool. As should be readily appreciated, since the modified activity data file (or new activity data file) may be arranged to accurately represent the number of tiers responsible for activity captured within the activity data file, more complete data may be presented to a user conducting further analysis utilizing the modified/new activity data file.

Figure 3:
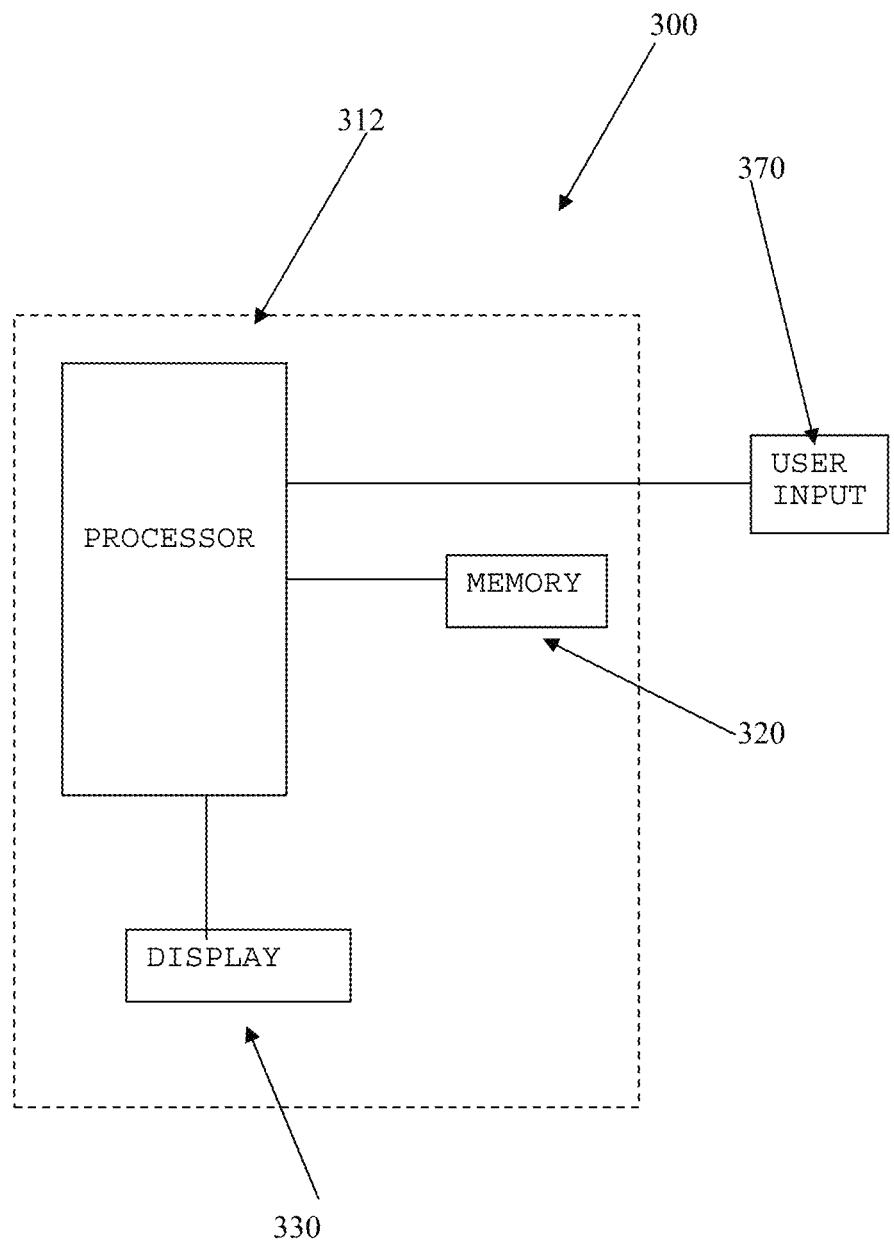
FIG. 3 shows a device in accordance with an embodiment of the present system.

FIG. 3 shows a device 300 in accordance with an embodiment of the present system. The device has a processor 310 operationally coupled to a memory 320, a display 330, and a user input device 370. The memory 320 may be any type of device for storing application data as well as other data, such as activity data, etc. The application data and other data are received by the processor 310 for configuring the processor 310 to perform operation acts in accordance with the present system. The operation acts include controlling of the display 330 to display the UI described herein. The user input 370 may include a keyboard, mouse, trackball or other device(s), including touch sensitive displays, which may be stand alone or be a part of a system, such as part of a personal computer, personal digital assistant, or other display device for communicating with the processor 310. The communication between the user input 370 and the processor 310 may be any type of operable link, such as a wired or wireless link. The user input device 370 is operable to enable initiation of processing acts, such as act 110 and following acts of FIG. 1 as well as enabling interaction with the acts. Clearly the processor 310, memory 320, display 330 and/or user input device 370 may all or partly be a portion of a computer system or other device.

The methods of the present system are particularly suited to be carried out by a computer software program, such program may contain modules corresponding to the individual steps or acts of the methods. Such program may of course be embodied in a computer-readable medium, such as an integrated chip, a peripheral device or memory, such as the memory 320 or other memory, such as a cache memory coupled to the processor 310.

The computer-readable medium and/or memory 320 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel). Any medium known or developed that may store information suitable for use with a computer system may be used as the computer-readable medium and/or memory 320.

Additional memories may also be used. The computer-readable medium (e.g., the memory 320) and/or any other memories may be long-term, short-term, or a combination of long-term and short-term memories. These memories configure processor 310 to implement the methods, operational acts, and functions disclosed herein. The memories may be distributed such as residing on one or more servers connected within a network or may reside local to the device 300 and the processor 310, where additional processors may be provided that may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 310. With this definition, information on a network is still within memory 320, for instance, because the processor 310 may retrieve the information from the network for operation in accordance with the present system.

The processor 310 is capable of providing control signals and/or performing operations in response to input signals from the user input device 370 and executing instructions stored in the memory 320. The processor 310 may be an application-specific or general-use integrated circuit(s). Further, the processor 310 may be a dedicated processor for performing in accordance with the present system or may be a general-purpose processor wherein only one of many functions operates for performing in accordance with the present system. The processor 310 may operate utilizing a program portion, multiple program segments, or may be a hardware device utilizing a dedicated or multi-purpose integrated circuit.

As should now be apparent, the present system aids a user in remapping virtual IP addresses to facilitate a proper identification of tiers responsible for network activity including an identification of the true source and destination endpoints and/or tier count in an activity data file. Of course, it is to be appreciated that any one of the above embodiments or processes may be combined with one or more other embodiments or processes or be separated into additional parts in accordance with the present system.

Finally, the above-discussion is intended to be merely illustrative of the present system and should not be construed as limiting the appended claims to any particular embodiment or group of embodiments. For example, while much of the illustrative discussion presented focuses on assisting in manual selection and remapping, the remapping process may be fully automatic in accordance with the present system, wherein the GUI 200 is provided for reviewing the remapping. In addition, while virtual IP addresses are illustratively identified and split in the above illustrative discussion by determining that the virtual IP address has at least two mapped MAC addresses, as would readily occur to a person skilled in the art, other criteria may also be suitably employed or combined with the illustrative system. For example, the virtual IP addresses may be identified and split based on an examination of an X-Forwarded-For (XFF) HTTP header to identify an originating IP address of a client that is different than a reported IP address of the client connecting to a web server through an HTTP proxy. In these cases, without the use of XFF or other criteria, any connection through a proxy server may reveal only an originating IP address of the proxy server, effectively turning the proxy server into a virtual IP address rendering the true originating IP address unavailable. However, in accordance with the present system, through an examination of criteria, such as examination of the XFF HTTP header, the true originating IP address may be discerned. Clearly other criteria for identifying virtual IP address would readily occur to a person of ordinary skill in the art and are intended to be within the scope of the present system.

Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts or steps is intended to be required unless specifically indicated; and
i) the term "plurality of" an element includes two or more of the claimed element, and does not imply any particular range of number of elements; that is, a plurality of elements may be as few as two elements, and may include an immeasurable number of elements.

We claim:

1. A method of analyzing network activity, wherein two or more devices in the network are mapped to a common address, said method comprising:
   receiving, by a processor, data indicating activity of the network;
   identifying, by the processor, two or more devices that map to a common address;
   modifying, by the processor, the activity data to indicate a unique individual address for each device that is mapped to the common address, wherein said modifying comprises generating a new internet protocol address for each media access control address that is mapped to the common address;

determining, by the processor, performance statistics related to each device based on the modified activity data; and outputting, by the processor, the determined performance statistics.

2. The method of claim 1, wherein identifying two or more devices that map to a common address comprises identifying a router that translates private internet protocol (IP) addresses of devices coupled to the router to a common, public IP address.

3. The method of claim 1, wherein identifying two or more devices that map to a common address comprises identifying a plurality of media access control addresses that are mapped to the common address.

4. The method of claim 1, wherein modifying, by the processor, the activity data to indicate a unique individual address for each device comprises generating a unique individual address for each device based on an X-Forwarded-For (XFF) HTTP header.

5. The method of claim 1, wherein modifying, by the processor, the activity data to indicate a unique individual address for each device comprises generating at least a portion of an internet protocol address for at least one of the devices.

6. The method of claim 5, wherein modifying, by the processor, the activity data to indicate a unique individual address for each device comprises generating, by the processor, a unique address for at least one of the devices responsive to a user input.

7. The method of claim 1, wherein modifying, by the processor, the activity data to indicate a unique individual address for each device comprises generating a new internet protocol address for at least one of the devices.

8. The method of claim 1, wherein modifying the activity data to indicate the unique individual address for each device that is mapped to a common address comprises generating an activity data file that indicates activity for each device.

9. The method of claim 1, wherein modifying the activity data to indicate the unique individual address for each device that is mapped to a common address comprises modifying an activity data file to indicate activity for each device.

10. A system comprising:
an input for receiving data indicating activity of the network;
a processor, configured by executable program code, to
identify two or more devices in the network that map to a common address,
modify the activity data to indicate a unique individual address for each device, wherein said modifying comprises generating a new internet protocol address for each media access control address that is mapped to the common address, and
determine performance statistics related to each device based on the modified activity data; and
an output device that is configured to provide the determined performance statistics to a graphical user interface.

11. The system of claim 10, wherein the processor is configured to identify a router that translates private internet protocol (IP) addresses of devices coupled to the router to a common, public IP address.

12. The system of claim 10, wherein the processor is configured to identify a plurality of media access control addresses that are mapped to the common address.

13. The system of claim 10, wherein the processor is configured to generate at least one individual address based on an X-Forwarded-For (XFF) HTTP header.

14. The system of claim 10, wherein the processor is configured to generate at least a portion of an individual internet protocol address for at least one of the devices.

15. The system of claim 10, wherein the processor is configured to generate the individual address responsive to a user input received via the graphical user interface.

16. The system of claim 10, wherein the processor is configured to generate a new internet protocol address for at least one of the devices.

17. The system of claim 10, wherein the processor is configured to generate an activity data file that indicates activity for each device.

18. The system of claim 10, wherein the processor is configured to modify an activity data file to indicate activity for each device.

19. A non-transitory computer readable medium that includes a program that, when executed by a processor, causes the processor to:
receive an activity data file that includes data indicative of activity of the network,
identify two or more devices in the network that map to a common address,
modify the activity data to indicate a unique individual address for each device, wherein said modifying comprises generating a new internet protocol address for each media access control address that maps to the common address,
determine performance statistics related to each device based on the modified activity data, and
provide the determined performance statistics to a graphical user interface.

20. The medium of claim 19, wherein the program causes the processor to identify the two or more devices via a process that includes identifying a router that translates private internet protocol (IP) addresses of devices coupled to the router to the common address.

21. The medium of claim 19, wherein the program causes the processor to identify the devices that map to the common address via a process that includes identifying a plurality of media access control addresses that are mapped to the common address.

* * * * *